US005371861A

United States Patent [19]

Keener et al.

[11] Patent Number: 5,371,861
[45] Date of Patent: Dec. 6, 1994

[54] PERSONAL COMPUTER WITH SMALL COMPUTER SYSTEM INTERFACE (SCSI) DATA FLOW STORAGE CONTROLLER CAPABLE OF STORING AND PROCESSING MULTIPLE COMMAND DESCRIPTIONS ("THREADS")

[75] Inventors: Don S. Keener; Gregory J. Moore, both of Boca Raton, Fla.

[73] Assignee: International Business Machines Corp., Armonk, N.Y.

[21] Appl. No.: 945,306

[22] Filed: Sep. 15, 1992

[51] Int. Cl.⁵ .............................................. G06F 13/10
[52] U.S. Cl. ........................... 395/325; 395/275; 364/228; 364/238.3; 364/239; 364/239.7; 364/260; 364/260.1; 364/231; 364/DIG. 1
[58] Field of Search ............... 395/325, 250, 275, 425, 395/775; 371/40.1; 340/825.06; 370/85.1

[56] References Cited

U.S. PATENT DOCUMENTS

| | | | |
|---|---|---|---|
| 4,783,705 | 11/1988 | Moon et al. | 360/77.08 |
| 4,905,184 | 2/1990 | Giridhar et al. | 395/400 |
| 4,965,801 | 10/1990 | Dulac | 371/40.1 |
| 5,179,667 | 1/1993 | Iyer | 395/275 |
| 5,233,692 | 8/1993 | Gajjar et al. | 395/325 |
| 5,241,630 | 8/1993 | Lattin, Jr. | 395/325 |
| 5,274,783 | 12/1993 | House et al. | 395/325 |
| 5,280,601 | 1/1994 | Desai et al. | 395/425 |
| 5,287,476 | 2/1994 | Keener et al. | 395/425 |
| 5,293,590 | 3/1994 | Keener et al. | 395/325 |
| 5,307,491 | 4/1994 | Feriozi et al. | 395/700 |

Primary Examiner—Gopal C. Ray
Attorney, Agent, or Firm—Daniel E. McConnell

[57] ABSTRACT

This invention relates to personal computers, and more particularly to a personal computer using a small computer systems interface (SCSI) controller for controlling data transfer with storage memory devices such as fixed or removable media electromagnetic storage devices. The personal computer has three interface circuits and a controller processor. The interface circuits control exchange of data among the system central processing unit (CPU), a controller processor, and one or more storage device(s) connected to a SCSI bus. One of the interface circuits includes a least one register for storing data indicative of the content and status of a plurality of sequences of commands ("threads") issued or to be issued to the SCSI device(s).

18 Claims, 4 Drawing Sheets

PERSONAL COMPUTER WITH SMALL COMPUTER SYSTEM INTERFACE (SCSI) DATA FLOW STORAGE CONTROLLER CAPABLE OF STORING AND PROCESSING MULTIPLE COMMAND DESCRIPTIONS ("THREADS")

Technical Field

This invention relates to personal computers, and more particularly to a personal computer using a small computer systems interface (SCSI) controller for controlling data transfer with storage memory devices such as fixed or removable media electromagnetic storage devices.

Background of the Invention

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 56, 57, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

As the development of personal computers has advanced, there have been proposals for certain standards to be established among makers and users of such apparatus for the purpose of enabling greater exchangability of components and the like. One such standard which have achieved some broad acceptance is the small computer systems interface (SCSI) standard for data communication to and from storage memory devices. For the present purposes, "storage memory devices" is defined broadly to include all devices capable of storing data in digital form, with particular emphasis on such devices as fixed or removable media electromagnetic storage devices (also known as hard and floppy disk drives), electro-optical, tape and other storage devices. SCSI controllers (herein also called "data flow controllers") have been known and used prior to this invention, and will be familiar to the knowledgeable reader.

In prior personal computer systems, SCSI controllers have typically been arranged as option or accessory devices, accessed by the system through the accessory or input/output or I/O bus. More recently, it has been contemplated to provide a SCSI controller as a single very large scale integrated (VLSI) device or application specific integrated circuit (ASIC) chip, and to provide for connection of that controller directly with the local processor bus. The purpose of so providing such a controller is to achieve enhanced performance in terms of expedited data transfers.

In prior systems having storage controllers, the controllers have typically comprised a group of disconnected state machines which are controlled by the system microprocessor. In such systems, the "intelligence" which runs the system, as to SCSI transfers, is the system microprocessor, with the SCSI controller (or controller chip set) being unaware of any pending commands or even the next phase of SCSI transfer which is to occur. While the system microprocessor is truly in control of the transfers, it is also very busy with other system operations and very slow in comparison to hardware logic speeds. This results in performance degradation of the SCSI subsystem.

Summary of the Invention

Having in mind the foregoing discussion, this invention provides a data flow storage controller which is capable of processing "normal" SCSI transactions absent any called-for assistance from a system processor and is capable of storing and process multiple SCSI command descriptions (here called "threads") absent any called-for assistance from a system processor. In realizing these characteristics of the present invention, SCSI command information is stored in elements here called threads, which contain all the information needed by the controller to accomplish a SCSI action desired. In order to start a command, a thread is loaded with the required information and a start bit is set.

A further characteristic of this invention is that multiple threads may be loaded and enabled. In the embodiment to be described hereinafter, the number is preferably eight, thus illustrating the capability of the SCSI system here described to enhance processing of data transfers.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
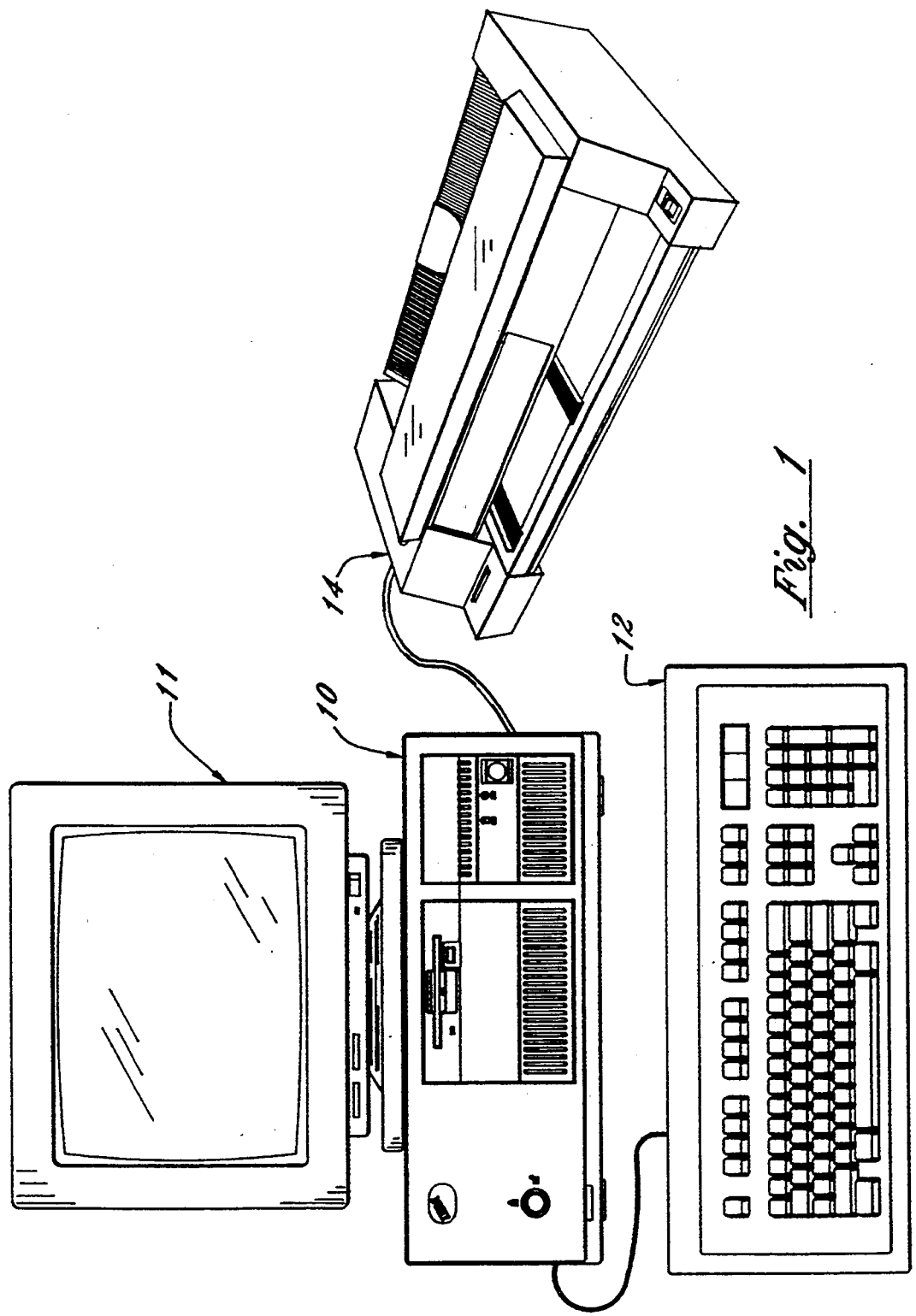
FIG. 1 is a perspective view of a personal computer embodying this invention.
Figure 2:
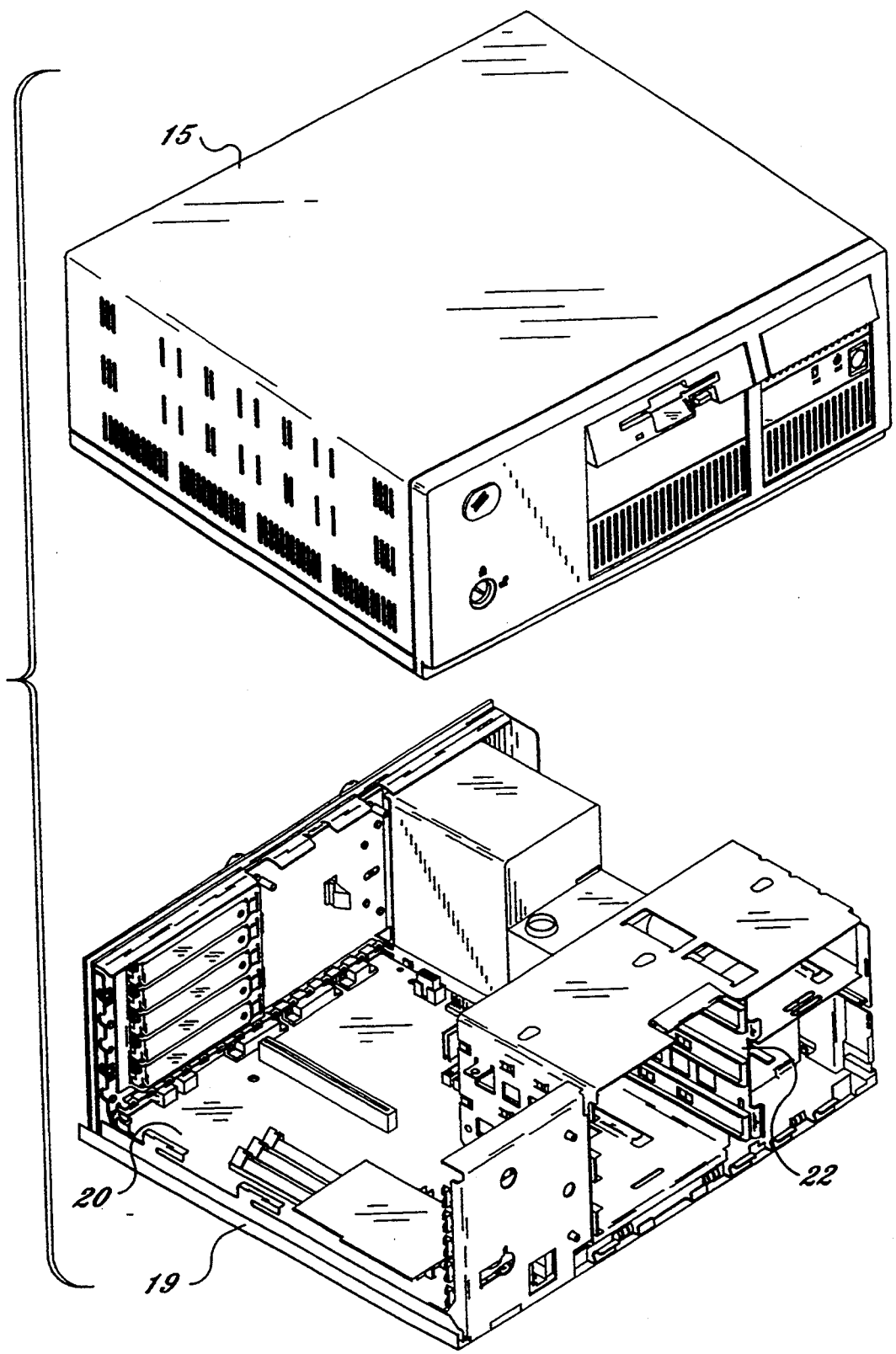
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
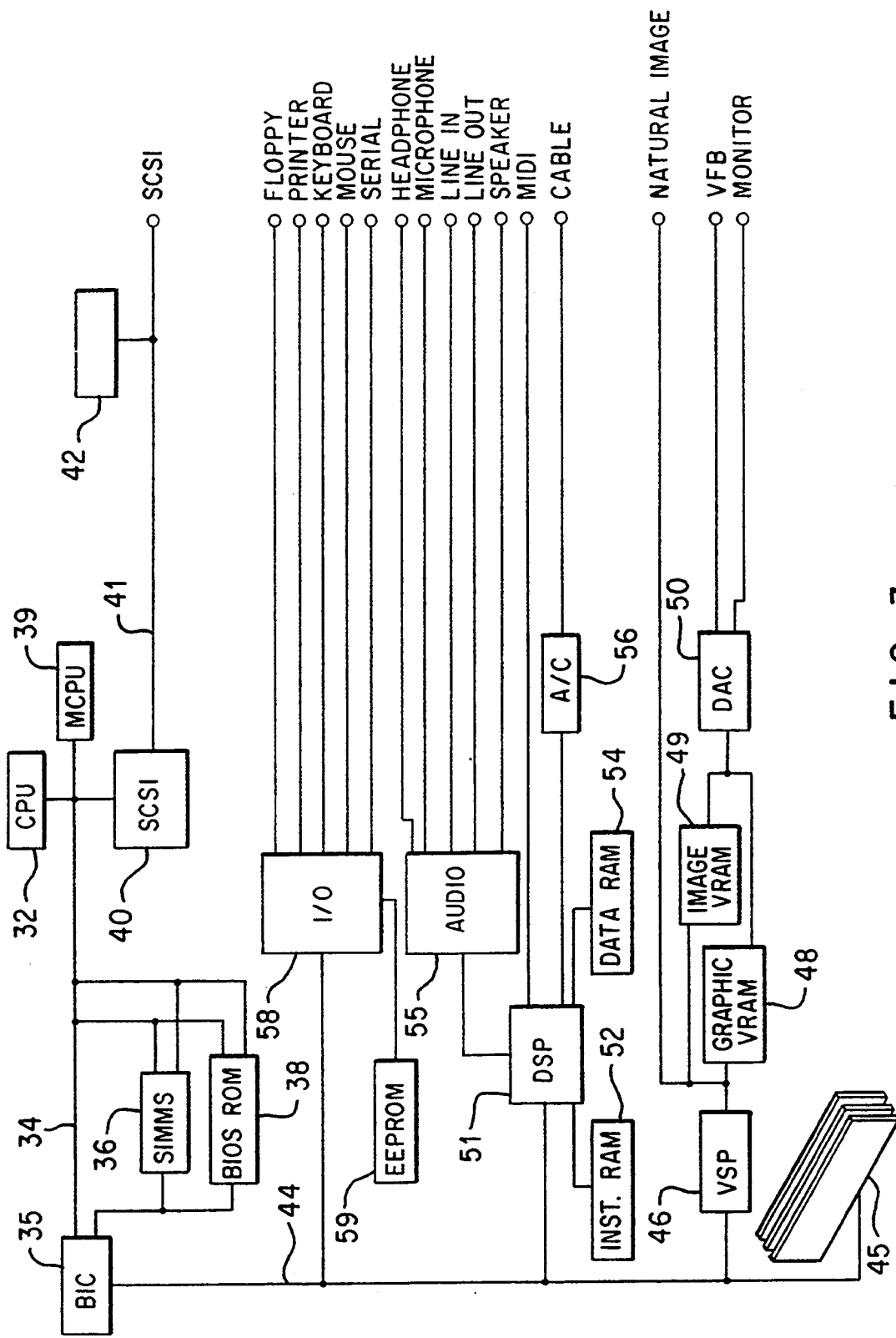
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with, the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 486SLC which is manufactured by IBM. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in ROM 38 can be copied into RAM 36 to decrease the execution time of BIOS.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80386 microprocessor.

Returning now to FIG. 3, the CPU local bus 34 (comprising data, address and control components) also provides for the connection of the microprocessor 32 with a math coprocessor 39 and a Small Computer Systems Interface (SCSI) data flow controller 40, about which more is said hereinafter. The SCSI controller 40 may, as is known to persons skilled in the arts of computer design and operation, be connected or connectable by way of a SCSI bus 41 with suitable external devices of a variety of types. The SCSI controller 40 functions as a storage controller in controlling storage memory devices such as fixed or removable media electromagnetic storage devices (also known as hard and floppy disk drives), electro-optical, tape and other storage devices. One such device is schematically illustrated in FIG. 3 at 42. While here illustrated as being a device connected directly with the local processor bus 34, the present invention also contemplates that the SCSI controller 40 may be provided as an option device connected through the I/O bus 44 mentioned hereinafter. Depending upon the particular system configuration involved, such connection by way of the I/O bus may be preferable and/or the only connection available for practice of this invention.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

Figure 4:
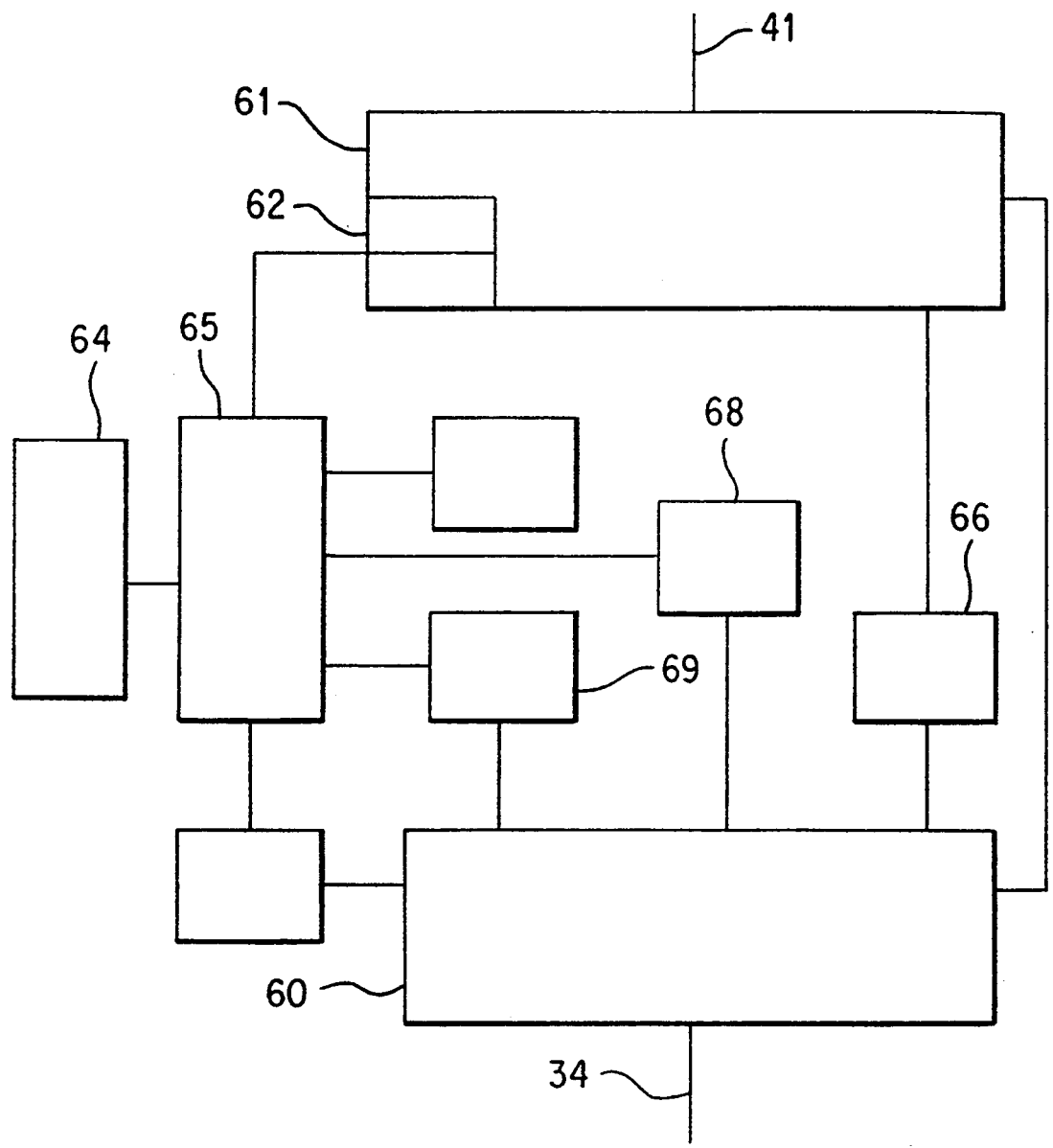
FIG. 4 is a schematic representation of certain functional components incorporated in the storage controller of the personal computer of FIGS. 1 through 3.

Referring now to FIG. 4, the data flow 40 controller (there illustrated in a block diagram form) has a first interface circuit 60 for exchanging signals with the CPU 32 and RAM 36, and a second interface circuit 61 for exchanging signals with the SCSI devices and operatively interconnected with the first interface circuit 60 for passing data between the SCSI devices and the RAM 36. The first interface circuit may also be referred to as the system interface, and is preferably connected either with the I/O bus 44 or the local processor bus 34. The second interface circuit may also be referred to as the controller core, and is preferably connected with the SCSI bus across which data is transferred to and from the associated storage devices. The second interface circuit 61 has at least one register 62 for storing data indicative of the content and status of a plurality of sequences of commands ("threads") issued to the SCSI devices.

The data flow controller 40 is provided with a controller processor 64 for controlling the flow of data through the first and second interface circuits 60, 61 and between the SCSI devices and the RAM 36. The controller processor preferably is an 8032 device operatively connected with the first interface circuit 60 for receiving instructions issued from the system CPU 32 and operatively connected with the second interface circuit 61 for issuing to the SCSI devices sequences of commands directing an exchange of data with the SCSI devices. A third interface circuit 65 is operatively connected with the first interface circuit 60 and with the second interface circuit 61 and with the controller processor 64 for passing to the controller processor that instruction among a plurality of instructions which is indicated by status indicative data stored in the register 62 to be the next instruction to control a command to be executed.

The data flow controller 40 further has a data FIFO register 66 operatively connected between the first and second interface circuits 60, 61 for passing data therebetween. The data flow controller also has an instruction FIFO register 68 operatively connected between the first and third interface circuits 60, 65 for passing therebetween instructions issued from the CPU 32 and intended for processing by the controller processor 64. The data flow controller 40 further has a decoding state machine 69 operatively connected between the second and third interface circuits 61, 65 for decoding instructions received from the CPU 32 into commands for execution by SCSI devices connected by way of the SCSI bus 41.

The controller processor 64 and first interface circuit 60 cooperate for enabling parallel execution of a plurality of sequences of commands by a corresponding plurality of SCSI devices connected by way of the SCSI bus 41.

In an operating embodiment of this invention, the SCSI controller uses eight registers in the second and third interface circuits 61, 65 to control the interface between the CPU 32 and the controller processor 64. The eight registers include four command interface registers through which a thirty two bit immediate command or an address for a subsystem control block can be passed to the controller processor 64. Three of these four registers are read/write as to the CPU 32 and read only as to the controller processor 64, while the remaining one is read/write as to both processors. The remaining four registers are used for passing interrupt and basic status data; two are read/write to one processor and read only as to the other while the remaining two are vice versa. An attention register and a basic control register are read/write as to the CPU 32; an interrupt status register and a basic status register are read/write as to the controller processor 64.

The operating embodiment uses twelve registers in the third interface circuit 65 to control operations of the controller processor 64 in performing SCSI functions. These registers include nine related to subsystem control block (SCB) transfers and three general registers to provide more general functions. SCB registers relating to channel address bits, channel transfer length, channel control and data are read/write as to the controller processor 64, while a FIFO byte count register is read only. The concept and organization of SCB transfers is beyond the scope of this disclosure, and the interested reader is referred to discussions to be found in available prior publications.

In accordance with important characterizing features of this invention, the second interface circuit 61 has at least one and preferably a plurality of registers for receiving and storing data related to sequences of operations to be performed by the controller 40. This (or these) register(s), here referred to as "a thread register", provides thread status and control information essential to the SCSI functions to be performed. By way of example only, a thread status register may use a plurality of bits to indicate that a thread should be started; that arbitration should be forced in order to select a target device; that a thread should be executed in a particular sequence, such as after completion of another (possibly a specific) thread; that a SCSI command has been completed; that there has been an error in execution of a command; that scatter/gather operation is needed; that the beginning portions of a threaded operation (arbitration, selection of a target device, dispatch of a message out, and command processing) have been executed; and that the controller is presently active on the SCSI bus executing a particular thread. A second thread status register may be provided to hold modifier bits indicative of any abnormal condition detected and registered in the first thread status register. One or two target information registers may be provided to hold information indicative of a particular target device for a particular thread.

In operation, should the CPU 32 identify that a particular exchange with a SCSI device is required, then appropriate data may be dispatched to the controller 40, stored in the thread register(s), and the transfer operation taken over by the controller processor 64. Upon completion of the directed exchange, the controller processor will signal an interrupt to the CPU 32 to enable transmittal of any further appropriate data. Additionally, as mentioned above, a plurality of sets of thread registers may be provided, in order that the CPU 32 may successively load a series of threads. Thus on each indicated interrupt to the CPU 32, the controller 40 is indicating that a (set of) thread register(s) is available for transmission of new instructions. With multiple threads enabled, both the CPU 32 and the controller processor 64 may operate at optimum levels, maintaining high data transfer rates between the system and the supporting SCSI devices.

In the drawings and specifications there has been set forth a preferred embodiment of the invention and, although specific terms are used, the description thus given uses terminology in a generic and descriptive sense only and not for purposes of limitation.

What is claimed is:

1. A data flow controller for use in a personal computer system having at least one small computer system interface (SCSI) peripheral device, system random access memory (RAM), and a system central processing unit (CPU) which issues instructions for the exchange of data between the peripheral device and the memory, the controller comprising:

a first interface circuit for exchanging signals with the CPU and RAM, a second interface circuit for exchanging signals with the SCSI device and operatively interconnected with said first interface circuit for passing data between the SCSI device and the RAM, a controller processor for controlling the flow of data through said first and second interface circuits and between the SCSI device and the RAM, said controller processor being operatively connected with said first interface circuit for receiving instructions issued from the CPU and operatively connected with said second interface circuit for issuing to the SCSI device a sequence of commands directing an exchange of data with the SCSI device, said second interface circuit comprising at least one register for storing data indicative of the status of a plurality of sequences of commands issued by said controller processor for directing exchanges of data with the SCSI device, and a third interface circuit operatively connected with said first interface circuit and with said second interface circuit and with said controller processor for passing to said controller processor that one instruction among a plurality of instructions which is indicated, by the data stored in said register which is indicative of the status of a plurality of sequences of commands issued by said controller processor for directing exchanges of data with the SCSI device, to be the next instruction to control a command to be executed.

2. A controller according to claim 1 further comprising a data FIFO register operatively connected between said first and second interface circuits for passing data therebetween.

3. A controller according to claim 1 further comprising an instruction FIFO register operatively connected between said first and third interface circuits for passing therebetween instructions issued from the CPU and intended for processing by said controller processor.

4. A controller according to claim 1 further comprising a decoding state machine operatively connected between said second and third interface circuits for decoding instructions received from said CPU into commands for execution by said SCSI device.

5. A data flow controller for use in a personal computer system having a plurality of small computer system interface (SCSI) peripheral devices, system random access memory (RAM), and a system central processing unit (CPU) which issues instructions for the exchange of data between the peripheral devices and the memory, the controller comprising:

a first interface circuit for exchanging signals with the CPU and RAM, a second interface circuit for exchanging signals with the SCSi devices and operatively interconnected with said first interface circuit for passing data between the SCSI devices and the RAM, a controller processor for controlling the flow of data through said first and second interface circuits and between the SCSI devices and the RAM, said controller processor being operatively connected with said first interface circuit for receiving instructions issued from the CPU and operatively connected with said second interface circuit for issuing to the SCSI devices sequences of commands directing an exchange of data with the SCSI devices, said second interface circuit comprising at least one register for storing data indicative of the status of a plurality of sequences of commands issued to the SCSI devices, and a third interface circuit operatively connected with said first interface circuit and with said second interface circuit and with said controller processor for passing to said controller processor that one instruction among a plurality of instructions which is indicated, by the data stored in said register which is indicative of the status of a plurality of sequences of commands issued by said controller processor for directing exchanges of data with the SCSI device, to be the next instruction to control a command to be executed.

6. A controller according to claim 5 further comprising a data FIFO register operatively connected between said first and second interface circuits for passing data therebetween.

7. A controller according to claim 5 further comprising an instruction FIFO register operatively connected between said first and third interface circuits for passing therebetween instructions issued from the CPU and intended for processing by said controller processor.

8. A controller according to claim 5 further comprising a decoding state machine operatively connected between said second and third interface circuits for decoding instructions received from said CPU into commands for execution by said SCSI devices.

9. A controller according to claim 5 wherein said controller processor and said first interface circuit cooperate for enabling parallel execution of a plurality of sequences of commands by a corresponding plurality of SCSI devices.

10. A personal computer system comprising:
a small computer system interface (SCSI) peripheral device,
system random access memory (RAM),
a system central processing unit (CPU) operatively connected with said SCSI device and said RAM for issuing instructions for the exchange of data between said SCSI device and said memory, and
a data flow controller having:
a first interface circuit for exchanging signals with the CPU and RAM,
a second interface circuit for exchanging signals with the SCSI device and operatively interconnected with said first interface circuit for passing data between the SCSI device and the RAM,
a controller processor for controlling the flow of data through said first and second interface circuits and between the SCSI device and the RAM, said controller processor being operatively connected with said first interface circuit for receiving instructions issued from the CPU and operatively connected with said second interface circuit for issuing to the SCSI device a sequence of commands directing an exchange of data with the SCSI device,
said second interface circuit comprising at least one register for storing data indicative of the status of a plurality of sequences of commands issued to the SCSI device, and a third interface circuit operatively connected with said first interface circuit and with said second interface circuit and with said controller processor for passing to said controller processor that one instruction among a plurality of instructions which is indicated, by the data stored in said register which is indicative of the status of a plurality of sequences of commands issued by said controller processor for directing exchanges of data with the SCSI device, to be the next instruction to control a command to be executed.

11. A personal computer according to claim 10 wherein said data flow controller further has a data FIFO register operatively connected between said first and second interface circuits for passing data therebetween.

12. A personal computer according to claim 10 wherein said data flow controller further has an instruction FIFO register operatively connected between said first and third interface circuits for passing therebetween instructions issued from the CPU and intended for processing by said controller processor.

13. A personal computer according to claim 10 wherein said data flow controller further has a decoding state machine operatively connected between said second and third interface circuits for decoding instructions received from said CPU into commands for execution by said SCSI device.

14. A personal computer system comprising:
a plurality of small computer system interface (SCSI) peripheral devices,
system random access memory (RAM),
a system central processing unit (CPU) operatively connected with said SCSI devices and said RAM for issuing instructions for the exchange of data between said SCSI devices and said memory, and
a data flow controller having:
a first interface circuit for exchanging signals with the CPU and RAM,
a second interface circuit for exchanging signals with the SCSI devices and operatively interconnected with said first interface circuit for passing data between the SCSI devices and the RAM,
a controller processor for controlling the flow of data through said first and second interface circuits and between the SCSI devices and the RAM, said controller processor being operatively connected with said first interface circuit for receiving instructions issued from the CPU and operatively connected with said second interface circuit for issuing to the SCSI devices sequences of commands directing an exchange of data with the SCSI devices,
said second interface circuit comprising at least one register for storing data indicative of the status of a plurality of sequences of commands issued to the SCSI devices, and
a third interface circuit operatively connected with said first interface circuit and with said second interface circuit and with said controller processor for passing to said controller processor that one instruction among a plurality of instructions which is indicated, by the data stored in said register which is indicative of the status of a plurality of sequences of commands issued by said controller processor for directing exchanges of data with the SCSI device, to be the next instruction to control a command to be executed.

15. A personal computer system according to claim 14 wherein said data flow controller further has a data FIFO register operatively connected between said first and second interface circuits for passing data therebetween.

16. A personal computer system according to claim 14 wherein said data flow controller further has an instruction FIFO register operatively connected between said first and third interface circuits for passing therebetween instructions issued from the CPU and intended for processing by said controller processor.

17. A personal computer system according to claim 14 wherein said data flow controller further has a decoding state machine operatively connected between said second and third interface circuits for decoding instructions received from said CPU into commands for execution by said SCSI devices.

18. A personal computer system according to claim 14 wherein said controller processor and said first interface circuit cooperate for enabling parallel execution of a plurality of sequences of commands by a corresponding plurality of SCSI devices.

* * * * *